United States Patent
Wang et al.

(10) Patent No.: US 10,410,055 B2
(45) Date of Patent: Sep. 10, 2019

(54) SYSTEM AND METHOD FOR AERIAL VIDEO TRAFFIC ANALYSIS

(71) Applicant: TuSimple, San Diego, CA (US)

(72) Inventors: Yijie Wang, San Diego, CA (US); Panqu Wang, San Diego, CA (US); Pengfei Chen, San Diego, CA (US)

(73) Assignee: TuSimple, San Diego, CA (US)

( * ) Notice: Subject to any disclaimer, the term of this patent is extended or adjusted under 35 U.S.C. 154(b) by 2 days.

(21) Appl. No.: 15/725,747

(22) Filed: Oct. 5, 2017

(65) Prior Publication Data

US 2019/0108384 A1 Apr. 11, 2019

(51) Int. Cl.
*G06K 9/00* (2006.01)
*G06K 9/20* (2006.01)
(Continued)

(52) U.S. Cl.
CPC .......... *G06K 9/0063* (2013.01); *B64C 39/024* (2013.01); *B64D 47/08* (2013.01);
(Continued)

(58) Field of Classification Search
CPC ..... G06K 2009/2045; G06K 2209/503; G06K 9/00208; G06K 9/0063; G06K 9/3241;
(Continued)

(56) References Cited

U.S. PATENT DOCUMENTS 6,263,088 B1 * 7/2001 Crabtree ............... G01S 3/7865
348/169
6,777,904 B1 8/2004 Degner
(Continued)

FOREIGN PATENT DOCUMENTS

EP 1754179 A1 2/2007
EP 2448251 A2 5/2012
(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.
(Continued)

*Primary Examiner* — Aklilu K Woldemariam
(74) *Attorney, Agent, or Firm* — Inventive Law, Inc.; Jim H. Salter (57) ABSTRACT

A system and method for aerial video traffic analysis are disclosed. A particular embodiment is configured to: receive a captured video image sequence from an unmanned aerial vehicle (UAV); clip the video image sequence by removing unnecessary images; stabilize the video image sequence by choosing a reference image and adjusting other images to the reference image; extract a background image of the video image sequence for vehicle segmentation; perform vehicle segmentation to identify vehicles in the video image sequence on a pixel by pixel basis; determine a centroid, heading, and rectangular shape of each identified vehicle; perform vehicle tracking to detect a same identified vehicle in multiple image frames of the video image sequence; and produce output and visualization of the video image sequence including a combination of the background image and the images of each identified vehicle.

16 Claims, 9 Drawing Sheets

US 10,410,055 B2

Page 2

(51) Int. Cl.
*G06K 9/62* (2006.01)
*B64D 47/08* (2006.01)
*B64C 39/02* (2006.01)
*G08G 1/01* (2006.01)

(52) U.S. Cl.
CPC ......... *G06K 9/00765* (2013.01); *G06K 9/209* (2013.01); *G06K 9/6256* (2013.01); *B64C 2201/123* (2013.01); *G06K 2209/21* (2013.01); *G08G 1/012* (2013.01)

(58) Field of Classification Search
CPC ............. G06K 9/4671; G06K 9/00785; G06K 9/00825; G06K 9/00771; G06T 2207/10016; G06T 2207/20221; G06T 2207/20224; G06T 2207/30212; G06T 2207/30232; G06T 2207/30241; G06T 3/4038; G06T 7/215; G06T 7/254; G06T 7/277; G06T 7/00; G06T 7/74; G06T 2207/10032; G06T 2207/30236; G06T 2207/30252; G06T 2207/30256; G06T 7/33; B64C 2201/127; B64C 2201/141; B64C 39/024; G05D 1/0088; G05D 1/104; G05D 1/0268; G06F 3/00; G08G 1/0116; G08G 1/0133; G08G 1/0175; G08G 1/04; A61B 5/18; G01C 21/3469; G01S 11/12; G01S 5/0009; G01S 5/16; B64D 47/08
USPC .................................. 382/103, 171, 173, 284
See application file for complete search history.

(56) References Cited

U.S. PATENT DOCUMENTS

| | | | |
|---|---|---|---|
| 7,103,460 B1 | 9/2006 | Breed | |
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-Guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Ben Shalom | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,483,839 B1* | 11/2016 | Kwon | H04N 5/33 |
| 9,490,064 B2 | 11/2016 | Hirosawa | |
| 9,531,966 B2 | 12/2016 | Stein | |
| 9,535,423 B1 | 1/2017 | Debreczeni | |
| 9,555,803 B2 | 1/2017 | Pawlicki | |
| 9,568,915 B1 | 2/2017 | Berntorp | |
| 9,587,952 B1 | 3/2017 | Slusar | |
| 9,652,860 B1* | 5/2017 | Maali | G06K 9/00335 |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 9,953,236 B1 | 4/2018 | Huang | |
| 10,147,193 B2 | 12/2018 | Huang | |
| 2003/0174773 A1* | 9/2003 | Comaniciu | H04N 19/23 375/240.08 |
| 2007/0183661 A1* | 8/2007 | El-Maleh | G06K 9/00234 382/173 |
| 2007/0183662 A1* | 8/2007 | Wang | G06K 9/00248 382/173 |
| 2007/0230792 A1 | 10/2007 | Shashua | |
| 2007/0286526 A1* | 12/2007 | Abousleman | G06K 9/4671 382/284 |
| 2008/0249667 A1 | 10/2008 | Horvitz | |
| 2009/0040054 A1 | 2/2009 | Wang | |
| 2009/0087029 A1* | 4/2009 | Coleman | G06K 9/00208 382/103 |
| 2010/0049397 A1 | 2/2010 | Lin | |
| 2010/0111417 A1* | 5/2010 | Ward | H04N 13/261 382/173 |
| 2010/0226564 A1 | 9/2010 | Marchesotti | |
| 2010/0281361 A1 | 11/2010 | Marchesotti | |
| 2011/0142283 A1* | 6/2011 | Huang | G06T 7/215 382/103 |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0274629 A1 | 11/2012 | Baek | |
| 2013/0083959 A1* | 4/2013 | Owechko | G06K 9/00771 382/103 |
| 2013/0266187 A1* | 10/2013 | Bulan | G06K 9/00785 382/104 |
| 2013/0329052 A1* | 12/2013 | Chew | H04N 7/181 348/159 |
| 2014/0072170 A1* | 3/2014 | Zhang | G06K 9/00369 382/103 |
| 2014/0104051 A1* | 4/2014 | Breed | G06K 9/00791 340/435 |

(56) References Cited

U.S. PATENT DOCUMENTS

| | | | |
|---|---|---|---|
| 2014/0145516 | A1 | 5/2014 | Hirosawa |
| 2014/0198184 | A1 | 7/2014 | Stein |
| 2014/0321704 | A1* | 10/2014 | Partis ................ G06K 9/00771 382/103 |
| 2014/0334668 | A1* | 11/2014 | Saund ....................... G06T 7/20 382/103 |
| 2015/0062304 | A1 | 3/2015 | Stein |
| 2015/0310370 | A1* | 10/2015 | Burry ................ G06K 9/00785 705/7.26 |
| 2015/0353082 | A1 | 12/2015 | Lee |
| 2016/0037064 | A1 | 2/2016 | Stein |
| 2016/0094774 | A1 | 3/2016 | Li |
| 2016/0118080 | A1* | 4/2016 | Chen ...................... G11B 27/28 386/344 |
| 2016/0129907 | A1 | 5/2016 | Kim |
| 2016/0165157 | A1 | 6/2016 | Stein |
| 2016/0210528 | A1 | 7/2016 | Duan |
| 2016/0321381 | A1 | 11/2016 | English |
| 2016/0375907 | A1 | 12/2016 | Erban |
| 2018/0151063 | A1* | 5/2018 | Pun ........................... G06F 3/00 |
| 2018/0158197 | A1* | 6/2018 | Dasgupta ............. G05D 1/0094 |
| 2018/0260956 | A1 | 9/2018 | Huang |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching For Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

Hou, Xiaodi, "Computational Modeling and Psychophysics in Low and Mid-Level Vision", California Institute of Technology, 2014.

Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010;Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date anknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision", arXiv:1703.04977v1 [cs.CV] Mar. 15, 2017.

Wei, Junqing, John M. Dolan, Bakhtiar Litkhouhi, "A Prediction- and Cost Function-Based Algorithm for Robust Autonomous Free- (56) References Cited

OTHER PUBLICATIONS way Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, March 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Kyoungho Ahn, Hesham Rakha, "The Effects of Route Choice Decisions on Vehicle Energy Consumption and Emissions", Virginia Tech Transportation Institute, date unknown.

* cited by examiner

SYSTEM AND METHOD FOR AERIAL VIDEO TRAFFIC ANALYSIS

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

This patent document pertains generally to tools (systems, apparatuses, methodologies, computer program products, etc.) for human driver modeling, trajectory generation and motion planning, vehicle control systems, autonomous driving systems, and autonomous driving simulation systems, and more particularly, but not by way of limitation, to a system and method for aerial video traffic analysis.

BACKGROUND

The control system of autonomous vehicles can sometimes be configured using a simulated human driver environment. The simulated human driver environment attempts to model the typical driving behavior of human drivers in various driving environments. However, the simulated human driver environment may be built based on the information gathered from the sensors and cameras on the autonomous vehicle or related probe vehicles. Because this information, including images from the vehicle cameras, can be subject to image occlusion and unreliable image reconstruction accuracy, the utility and effectiveness of the simulated human driver environment is degraded. Additionally, the image occlusion problem is further complicated by shadows cast by both the vehicles themselves and overhead objects such as trees, buildings, construction equipment, and the like. Classic color-based methods for shadow detection or removal do not work in this case; because of the diversity of vehicle types and colors. Because of these problems with the image data gathered for configuring the simulated human driver environment, the effectiveness of the control systems of autonomous vehicles based on the degraded simulated human driver environment can be compromised.

SUMMARY

A system and method for aerial video traffic analysis is disclosed herein. Aerial video traffic analysis includes the task of extracting traffic information, including the shape, heading, and trajectories of ground vehicles, from aerial videos captured by aerial vehicles (e.g., UAVs) positioned directly above a road surface at a desired geographical location and altitude. Aerial video is an inexpensive way to collect traffic information. Aerial video traffic analysis as disclosed herein can provide important insights into human driving behaviors in real-world traffic environments and conditions. These human driving behavior insights can be used to train a human driving behavior model, which can be used with a simulation environment for configuring autonomous vehicle control systems. In the various example embodiments disclosed herein, solutions are presented for accomplishing aerial video traffic analysis by combining classic and deep computer vision methods with a specially tailored deep learning model. The example embodiments disclosed herein can achieve pixel-level accuracy in most conditions. The example embodiments also solve another challenging problem caused by the diversity of vehicles in typical traffic environments. The example embodiments disclosed herein can recognize all types of vehicles from tiny ones like motorcycles to huge ones like car carrier trailers. The disclosed example embodiments are insensitive to the size of vehicles, making the various embodiments suitable for all types of vehicles.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Figure 1:
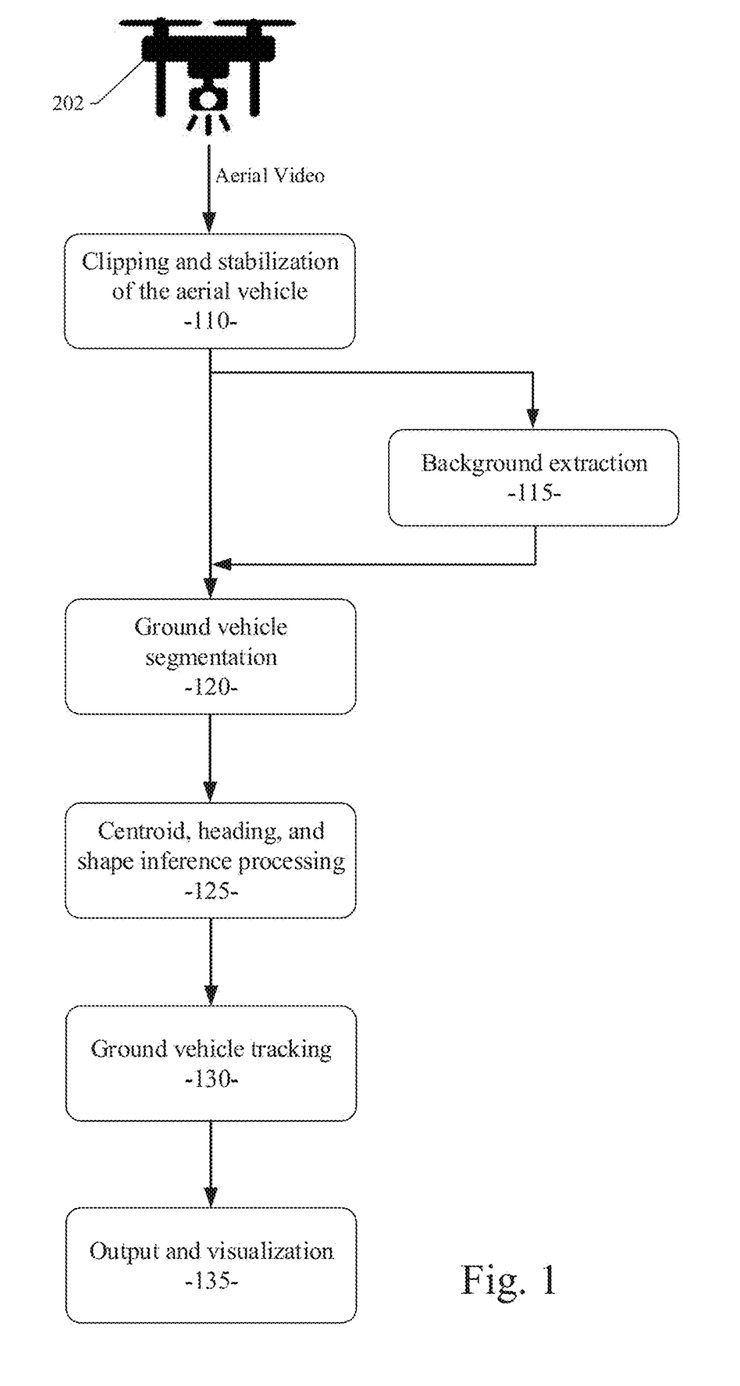
FIG. 1 is an operational flow diagram illustrating an example embodiment of a system and method for traffic data collection using unmanned aerial vehicles (UAVs)

FIG. 1 is an operational flow diagram illustrating an example embodiment of a system and method for traffic data collection using unmanned aerial vehicles (UAVs). FIGS. 2 through 5 illustrate an example scenario of the operations shown in FIG. 1, wherein a UAV is configured with a camera and positioned at a certain location to be monitored at an elevated position to record video of the traffic activity at the location within the UAV's field of vision. Referring now to FIG. 1, a system and process for aerial video traffic analysis in an example embodiment starts with collecting aerial video image data taken by UAVs 202 that fly directly above a certain location to be monitored (e.g., expressways).

Figure 2:
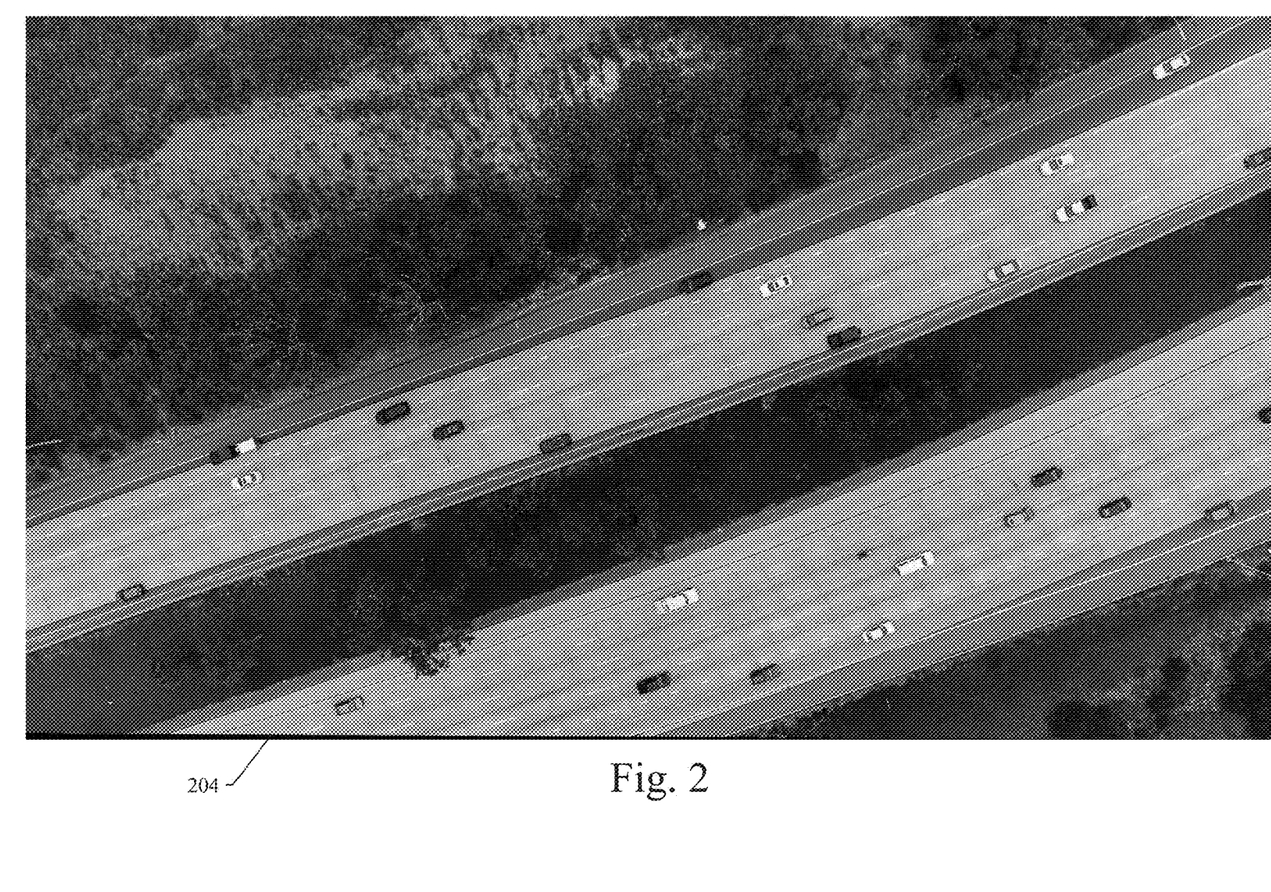
FIGS. 2 through 5 illustrate an example scenario wherein a UAV is configured with a camera and positioned at a certain location to be monitored at an elevated position to record video of the traffic activity at the location within the UAV's field of vision.

Referring now to FIG. 2, an example scenario shows a sample image captured by UAV 202 with a camera positioned at a certain location to be monitored at an elevated position to record video image data of the traffic activity at the location 204 within the UAV's field of vision. The system and method of an example embodiment provides traffic data collection using modern UAVs, which create a bird's-eye (elevated) view and provide accurate data related to traffic activity in view of the UAV. Modern UAVs 202 are able to hover or move in the sky at an elevated position to collect data related to a location with a high degree of stability regardless of weather conditions that may be inappropriate for data collection. With a high definition and stabilized camera configured on a UAV 202, data with unprecedented high quality can be collected. The data collected reflects truly realistic real-world traffic information related to the location being monitored. Additionally, the UAVs' presence does not interfere with the traffic activity the UAV is viewing, which is in contrast to any data collection method currently in practice. Further, data collection using UAVs 202 eliminates occlusion problems caused by obstructions in the camera's field of view. The lack of occlusion is crucial for the efficient and high fidelity image data processing performed after the data is collected. Finally, average inexpensive consumer UAVs 202 are sufficient to fulfill most image data collection tasks.

Referring still to FIG. 2, the UAV 202 can collect unobstructed video image data from the monitored location 204. As a result, the collected video image data can include images of roadways, traffic flows, and vehicles or other objects in the field of view over a pre-determined time period. The activity and behavior of the vehicles and objects at the location 204 can thereby be recorded and later analyzed and processed for inclusion into a human driver model. The video captured by the UAV 202 is unobstructed and thus provides a consistently clear aerial view of the monitored location 204, which provides more accurate and useful data for the human driver model. The elevated position of the UAV 202 enables better video capture, which results in better modeling and simulation. Additionally, the use of UAVs can be done with less expense and without interference with the environment as compared with the traditional systems where cameras are mounted on a probe vehicle or mounted at a fixed ground-based location.

Referring still to FIGS. 1 and 2, the UAVs 202 should ideally remain stationary when recording the video image data, but a small amount of drift is tolerable. Nevertheless, the example embodiment provides a clipping and stabilization operation (operation block 110, shown in FIG. 1) to correct for errant image data. The clipping and stabilization operation is performed on the video image data to completely remove any drift in the field of view. Clipping removes any part of the video image data in which the UAV 202 moves erratically. Stabilization aligns the background surface of all video frames to that of a chosen reference frame. In a particular embodiment, a Harris corner detector can be used to select keypoints on the reference frame. Harris corner detection is a well-known process used within computer vision systems to extract certain kinds of features and to infer the contents of the image. Next, the example embodiment can apply a pyramidal Lucas-Kanade sparse optical flow process to find keypoints corresponding to points in each video frame. In computer vision, the Lucas-Kanade method is a widely used differential method for optical flow estimation developed by Bruce D. Lucas and Takeo Kanade. By combining information from several nearby pixels, the Lucas-Kanade method can often resolve the inherent ambiguity of the optical flow equation. Additionally, the example embodiment can use a random sample consensus (RANSAC) method to solve for a perspective transformation matrix that embodies the alignment of each video frame with the reference frame. RANSAC is an iterative method to estimate parameters of a mathematical model from a set of observed data that contains outliers, when outliers are to be accorded no influence on the values of the estimates. As a result, the example embodiment can align the background surface of all video frames to that of a chosen reference frame. Stabilization of each frame is performed using the perspective transformation matrix. Segments of the video image data can be removed, if the matrix indicates that the UAV motion is larger than desired. The removal of unsuitable video segments is called clipping.

Figure 3:
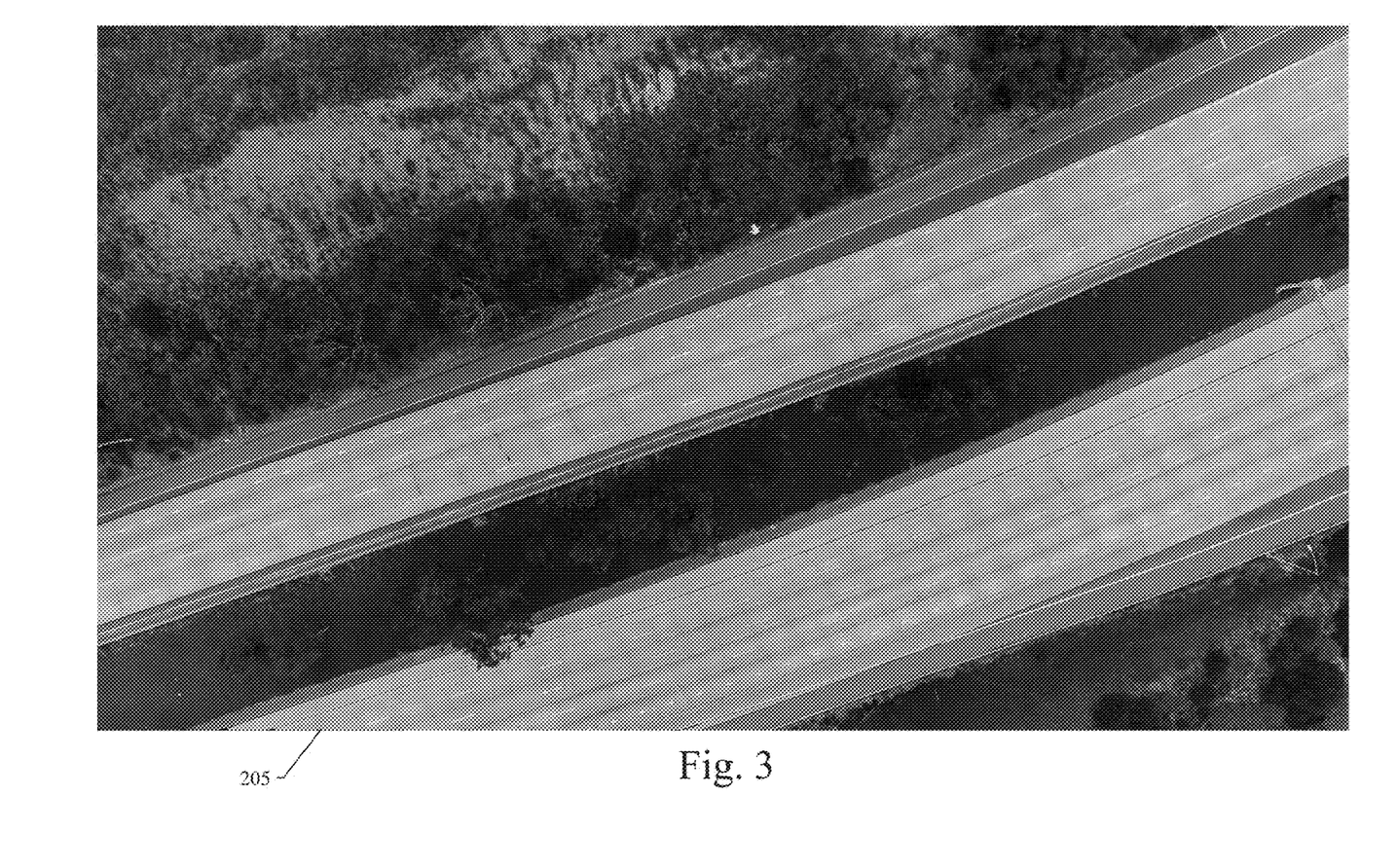

Referring now to FIG. 3, before the video image data is sent to the vehicle segmentation module 183 (shown in FIG. 7), background extraction can be performed on the video image data to generate a realistic image without any moving vehicles (operation block 115, shown in FIG. 1). In an example embodiment, background extraction can be based on a RANSAC-like process, in which, for each pixel in the field of view, the dominant color value is inferred from a collection of frames sampled over time from the video. This process tends to filter out moving objects (e.g., vehicles) from the background image; because, the pixels of the moving objects are not static over the collection of frames. In practice, this background extraction process works very well, generating background images 205 that are almost indistinguishable from real ones as shown in the example of FIG. 3.

Figure 4:
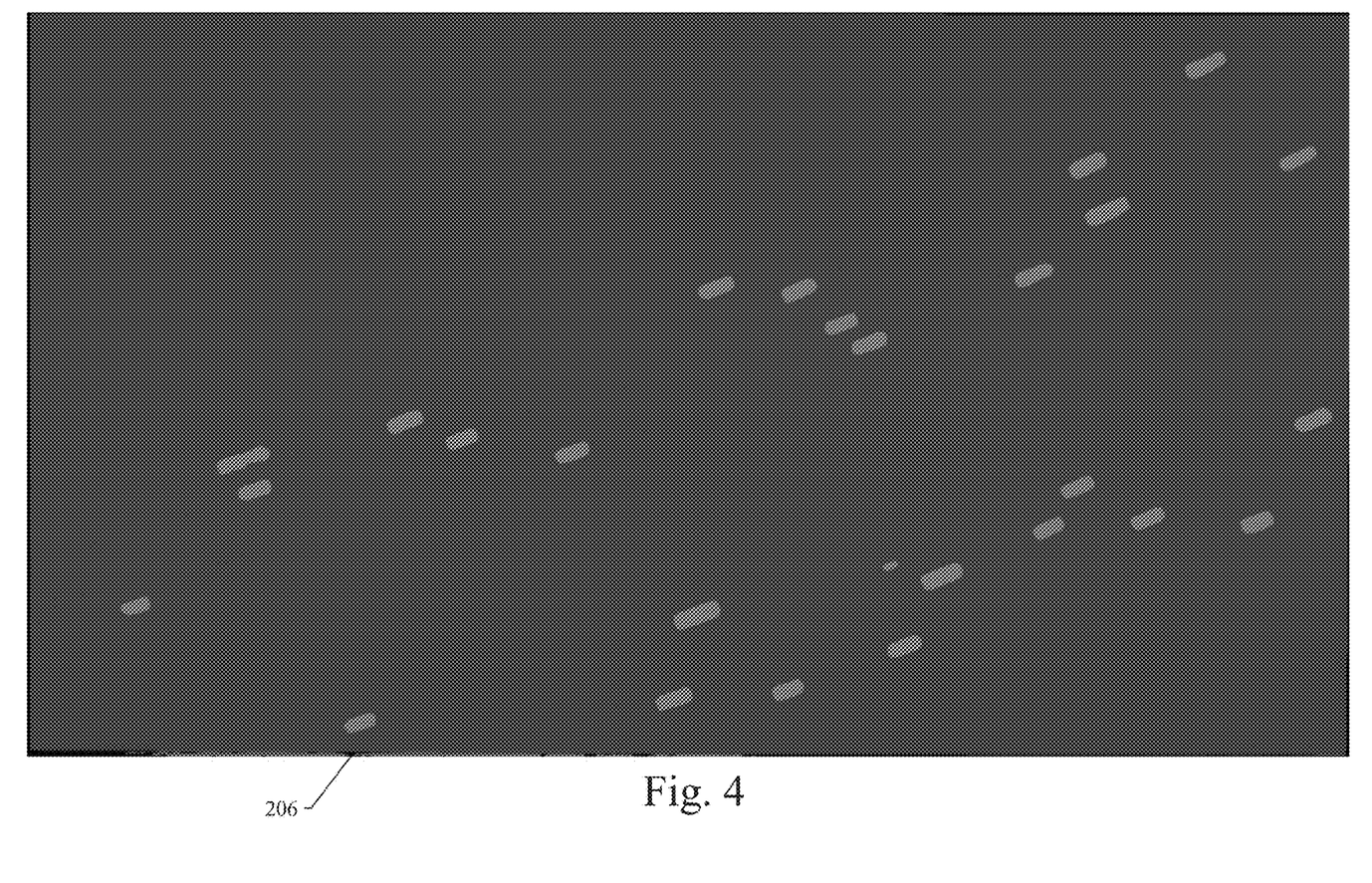

Referring now to FIG. 4, after the background is extracted from each video image as described above, the example embodiment can segment each video frame to identify the locations and shapes of the moving objects captured in the video image frames. This part of the process of an example embodiment is denoted ground vehicle segmentation (operation block 120, shown in FIG. 1). The vehicle segmentation module 183 (shown in FIG. 7) can be used for this process. The vehicle segmentation module 183 of an example embodiment can take two inputs: 1) each frame in the video image data, and 2) the corresponding background images extracted in the manner described above. For each frame in the video image data, the video image frame can be concatenated with the corresponding background image. The concatenated image data can be processed by a neural network of the vehicle segmentation module 183. In one example embodiment, a U-net architecture can be used for the neural network processing. The U-net is a convolutional network architecture for fast and precise segmentation of images. The neural network can output a binary classification of each pixel in the field of view, the binary classification representing whether the pixel is part of a vehicle or not. The training of this neural network is detailed below. The collection of binary classifications of each pixel in the field of view can be used to generate a vehicle segmentation mask, which defines the location and general or rough shape of each vehicle object identified in the video image frames within the field of view.

Referring still to FIG. 4, after the vehicle segmentation mask is generated as described above, the example embodiment can use the vehicle segmentation mask to infer the centroid, heading, and rectangular shape of each vehicle identified by the neural network (operation block 125, shown in FIG. 1). A visual representation 206 of this data is shown in the example of FIG. 4. This representation is typically a better and more useful representation as compared with a general vehicle mask, as most vehicles identified in images captured by a UAV are rectangular when viewed top-down.

As part of the process for determining the centroid, heading, and rectangular shape of each identified vehicle, the example embodiment first removes noisy points in the segmentation results produced by the vehicle segmentation module 183. Then, the remaining connected pixel components corresponding to each vehicle can be used to represent the shape of the vehicle identified in the image data. The center-of-mass of the connected components corresponding to the vehicle can be used as the centroid of the vehicle. The heading of the vehicle can be determined by solving for the eigenvectors of a centered covariance matrix corresponding to the connected components of the vehicle. As a result, the example embodiment can generate the direction along which the variance of the shape as a distribution is maximized. This direction corresponds to the heading of the vehicle associated with the shape distribution. The rectangular shape of the vehicle is inferred by taking percentiles of the shape projected along and perpendicular to the heading direction. In this manner, geometric information of each vehicle in each video frame can be extracted. Similarly, the centroid, heading, and rectangular shape of each identified vehicle can be determined as described above.

Once the geometric information of each vehicle in each video frame is extracted as described above, vehicle tracking through a collection of image frames over time can be performed (operation block 130, shown in FIG. 1). The vehicle tracking module 185 (shown in FIG. 7) can be used for this process. The vehicle tracking module 185 in the example embodiment can be applied to associate same vehicle detections in multiple image frames. In the example embodiment, a tracking method can be used, in which each vehicle detection in a single image frame can be associated with at most one vehicle detection in a previous or subsequent image frame. If image data corresponding to a vehicle detection overlaps in two sequential image frames, the vehicle tracking module 185 can infer the same vehicle detection in the multiple image frames. In this manner, the vehicle tracking module 185 can follow a same vehicle through multiple image frames and determine a velocity of the vehicle. A visible velocity vector corresponding to the velocity of each vehicle can be generated and added to the video image data. The vehicle tracking module 185, in the example embodiment, works very well, even for tiny vehicles like motorcycles, as long as the vehicle segmentation is accurate. In an alternative embodiment, each instance of the vehicles identified in the input image data 210 (shown in FIG. 7) can be tagged with a unique identifier to differentiate between the different vehicles and to enable tracking of the same vehicle in different image frames with the same identifier. This tagging process can be used, if needed, to facilitate the identification and tracking of multiple vehicles across multiple image frames.

Figure 5:
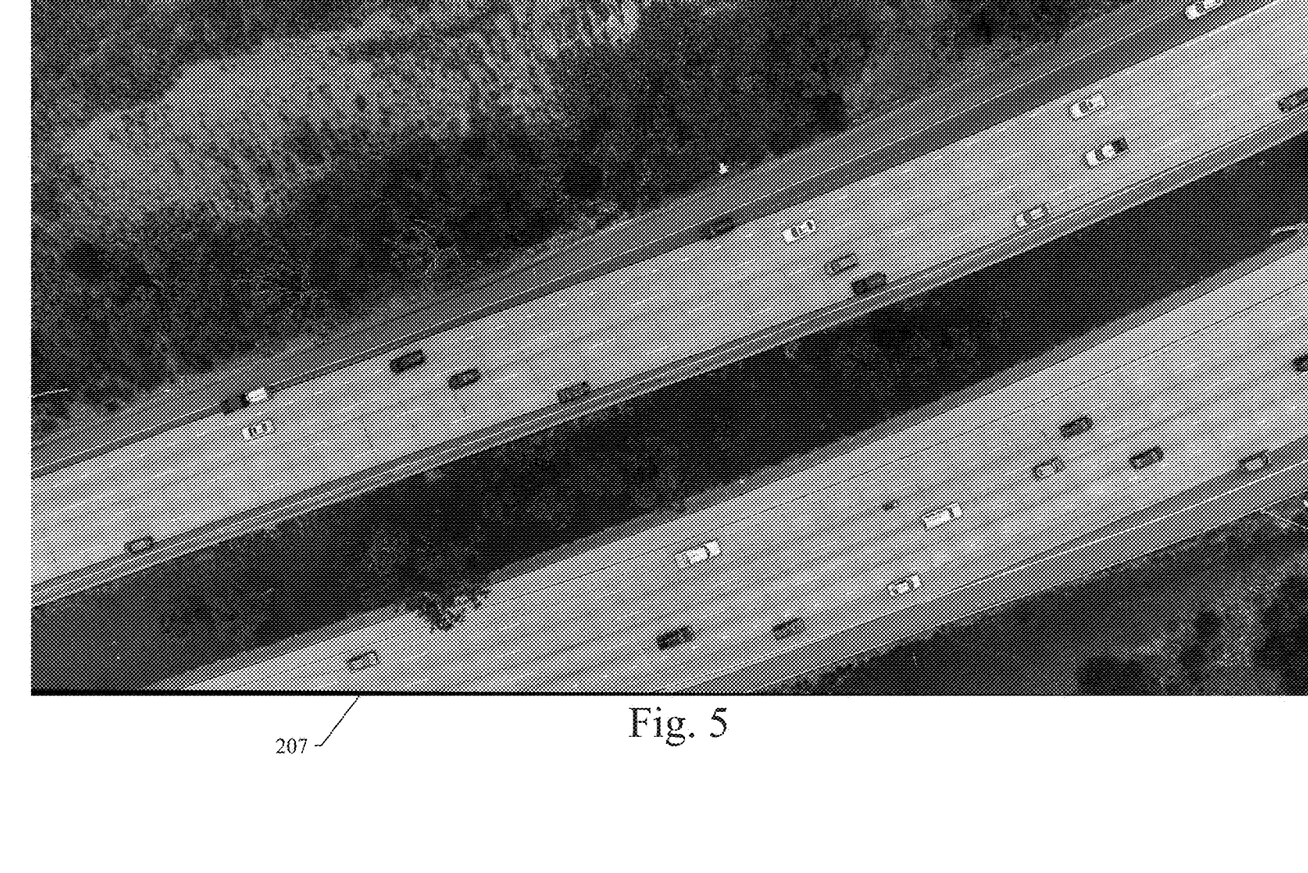

Referring now to FIG. 5, after the centroid, heading, rectangular shape, tracking data, and velocity vector for each identified vehicle have been determined or generated as described above, an output and visualization representation 207 of the vehicle data for the identified vehicles can be generated as shown (operation block 135, shown in FIG. 1). The output and visualization representation 207 can include a combination of the background image and the images of each identified vehicle with visual bounding boxes and velocity vectors, if desired. The data corresponding to the output and visualization representation 207 can be used by the human driver model system 201, as described in more detail below, to build a model for representing typical driving behaviors in the environment imaged by the UAV.

Training of the Vehicle Segmentation Module in an Example Embodiment

Figure 6:
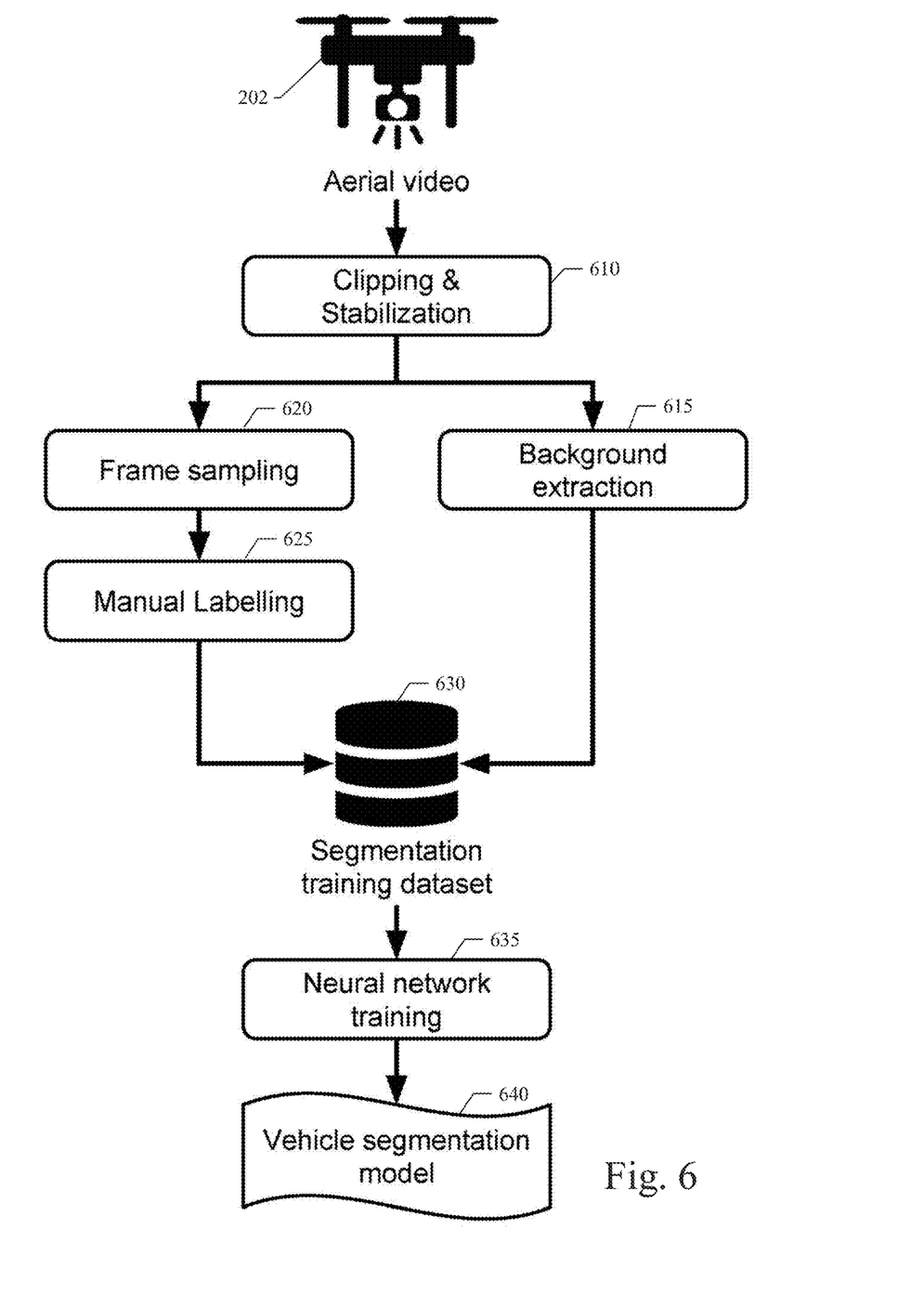
FIG. 6 is an operational flow diagram illustrating an example embodiment of a system and method for training the vehicle segmentation module of the example embodiment.

FIG. 6 is an operational flow diagram illustrating an example embodiment of a system and method for training the vehicle segmentation module 183 of the example embodiment. In the example embodiment described herein, the only module in the aerial video analysis and processing pipeline that requires training is the vehicle segmentation module 183. The training of the vehicle segmentation module 183 can be performed in an offline training process as described in detail below in connection with FIG. 6.

In the offline training process of an example embodiment, in order to train the neural network of vehicle segmentation module 183 that separates vehicle objects from the background image, the offline training process includes collecting and labeling a training image dataset. In an example embodiment, a UAV is configured with a camera and positioned at a certain location to be monitored at an elevated position to record video of the traffic activity at the location within the UAV's field of vision. Referring to FIG. 6, the method for training the vehicle segmentation module 183 of the example embodiment starts with collecting aerial video image data taken by UAVs 202 that fly directly above a certain location to be monitored (e.g., expressways). The data collected by UAVs 202 reflects truly realistic real-world traffic information related to the location being monitored. The UAV 202 can collect unobstructed video image data from the monitored location 204. As a result, the collected video image data can include images of roadways, traffic flows, and vehicles or other objects in the field of view over a pre-determined time period. The activity and behavior of the vehicles and objects at the location 204 can thereby be recorded and later used to train the vehicle segmentation module 183 to accurately recognize vehicle objects in the image data.

Referring still to FIG. 6, the UAV 202 should ideally remain stationary when recording the video image data, but a small amount of drift is tolerable. Nevertheless, the example embodiment provides an offline clipping and stabilization operation (operation block 610, shown in FIG. 6) to correct for errant image data. The offline clipping and stabilization operation 610 is performed on the video image data to completely remove any drift in the field of view. Clipping removes any part of the video image data in which the UAV 202 moves erratically. Stabilization aligns the background surface of all video frames to that of a chosen reference frame. As described above for a particular embodiment, a Harris corner detector can be used to select keypoints on the reference frame. The example embodiment can apply a pyramidal Lucas-Kanade sparse optical flow process to find keypoints corresponding to points in each video frame. Additionally, the example embodiment can use a random sample consensus (RANSAC) method to solve for a perspective transformation matrix that embodies the alignment of each video frame with the reference frame. As a result, the example embodiment can align the background surface of all video frames to that of a chosen reference frame. Stabilization of each frame is performed using the perspective transformation matrix. Segments of the video image data can be removed, if the matrix indicates that the UAV motion is larger than desired. The removal of unsuitable video segments is called clipping.

Referring still to FIG. 6, an offline background extraction operation 615 can be performed on the video image data to generate a realistic image without any moving vehicles. In an example embodiment as described above, background extraction can be based on a RANSAC-like process, in which, for each pixel in the field of view, the dominant color value is inferred from a collection of frames sampled over time from the video.

Referring still to FIG. 6, after the background is extracted from each video image in operation 615 as described above, the example embodiment can store the generated data in a segmentation training dataset 630 retained in a data storage device and used for training the neural network of the vehicle segmentation module 183. Additionally, frames of the clipped and stabilized aerial video image data can be randomly sampled in operation 620 and passed to a manual image labeling process 625. The manual image labeling process 625 can include presenting the sampled image frames to human labelers or offline automated processes for manual segmentation labeling of the sampled image frames. During the manual segmentation labeling process, human labelers can draw the shapes of all vehicles in the frames. The purpose of the manual image labeling process 625 is to provide a ground truth dataset with which the vehicle segmentation module 183 can be trained. The manual segmentation labeling data generated by the manual image labeling process 625 can be stored in the segmentation training dataset 630 retained in the data storage device. Upon completion of the background extraction process 615 and the manual image labeling process 626, the sampled image frames, their corresponding background image frames, and the segmentation labelling are collected as segmentation training dataset 630 and retained for neural network training. In the example embodiment, the neural network of the vehicle segmentation module 183 can be a common neural network architecture, such as the U-net architecture described above. The neural network of the vehicle segmentation module 183 can be trained using the video image frames, the corresponding background image frames, and the manual segmentation labelling as input from the segmentation training dataset 630. Using standard neural network training procedures, the segmentation training dataset 630 can be used to configure parameters in the vehicle segmentation module 183 to cause the vehicle segmentation module 183 to accurately identify vehicle objects in one or more video image frames provided by UAVs 202. As a result, the vehicle segmentation module 183 can be trained to output accurate vehicle segmentation labelling and serve as an effective vehicle segmentation model 640, which is highly useful to support the aerial video traffic analysis system described herein.

As described above, a system of an example embodiment can provide aerial video traffic analysis. The example embodiment can include a corresponding method, which can be configured to:

1. Receive a sequence of images (e.g., video);
2. Clip the image sequence by removing unnecessary images (e.g., remove the images captured when the UAV takes off, lands, or only captures a part of a target location);
3. Stabilize the image sequence by choosing a reference image and adjusting/calibrating other images to the reference image;
4. Extract the background image of the image sequence for vehicle segmentation, extract the background image without vehicles on a pixel by pixel basis;
5. Perform object/vehicle segmentation to identify objects/vehicles in the image sequence on a pixel by pixel basis;
6. Determine the centroid, heading, and rectangular shape of each identified vehicle;
7. Perform vehicle tracking to detect the same identified vehicle in multiple image frames of the image sequence; and
8. Produce output and visualization of the image sequence including a combination of the background image and the images of each identified vehicle with visual bounding boxes and velocity vectors, if desired.

Figure 7:
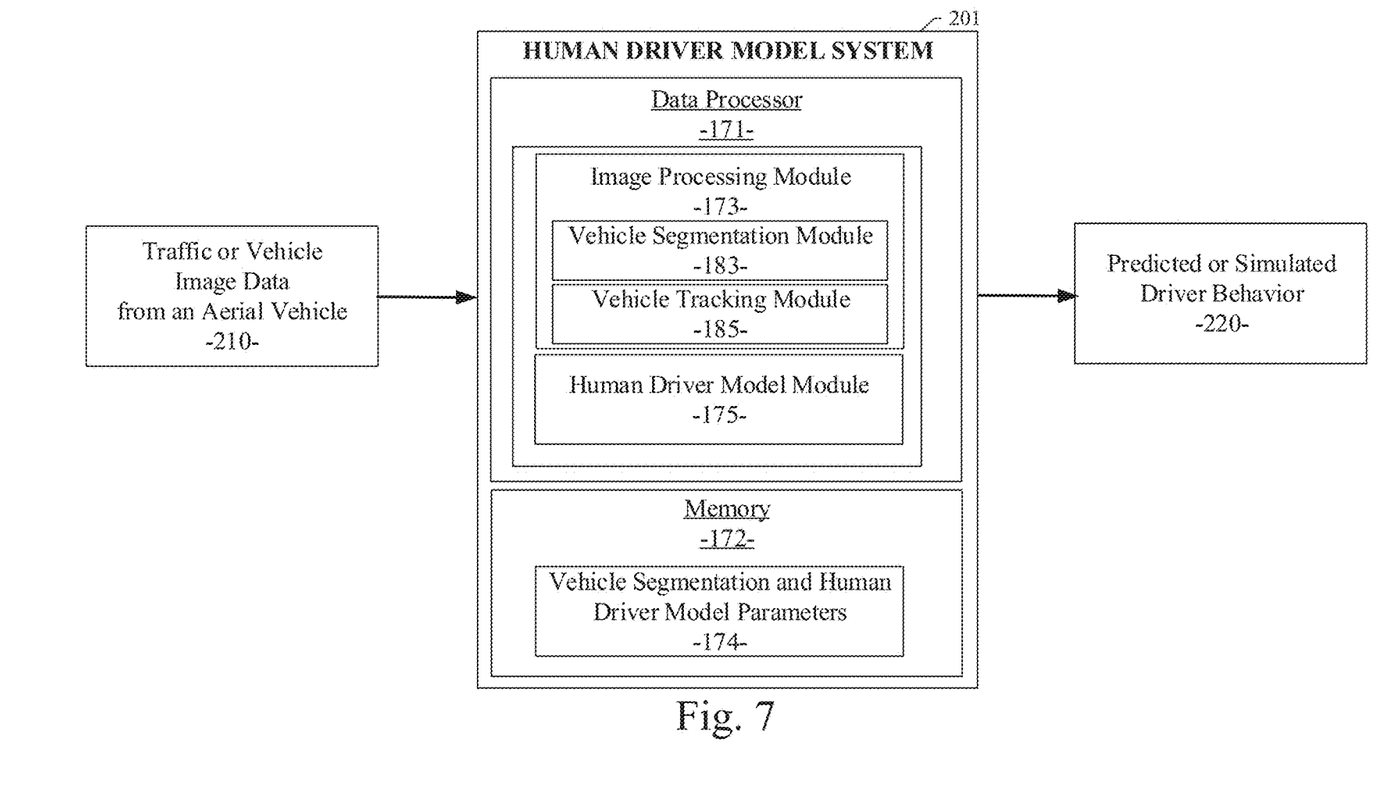
FIG. 7 illustrates the components of a human driver model system of an example embodiment.

Referring now to FIG. 7, an example embodiment disclosed herein can be used in the context of a human driver model system 201 for autonomous vehicles. In one example embodiment, the human driver model system 201 can receive high definition image data and other sensor data (e.g., traffic or vehicle image data 210) from a UAV positioned above a particular roadway (e.g., monitored location) being monitored. The image data collected by the UAV reflects truly realistic, real-world traffic information related to the location being monitored. Using the standard capabilities of well-known UAV's, the traffic or vehicle image data 210 can be wirelessly (or otherwise) transferred to a data processor 171 of a standard computing system, upon which a human driver model module 175 and/or an image processing module 173 can be executed. Alternatively, the traffic or vehicle image data 210 can be stored in a memory device on the UAV and transferred later to the data processor 171. The processing performed by the human driver model module 175 of an example embodiment is described in more detail below. The traffic or vehicle image data 210 provided by the deployed UAV can be received and processed by the image processing module 173, which can also be executed by the data processor 171. As described above, the image processing module 173 can perform clipping, stabilization, background extraction, object/vehicle segmentation, vehicle centroid, heading, and shape inference processing, vehicle tracking, output and visualization generation, and other image processing functions to isolate vehicle or object presence and activity in the received images. The human driver model module 175 can use the information related to these real-world vehicle or objects to create corresponding simulations of vehicles or objects in the human driver model. Parameter values retained in a vehicle segmentation and human driver model parameter dataset 174 stored in a memory 172 can be used to configure the operation of the human driver model module 175. As described in more detail above, the elevated position of the UAV above the location being monitored and the stabilized high definition camera on the UAV provides a highly valuable and useful image and data feed for use by the human driver model module 175. As a result of the processing performed by the human driver model system 201, data corresponding to predicted or simulated driver behaviors 220 can be produced and provided to a user or other system components. In particular, the predicted or simulated driver behavior data 220 can be provided to a system component used to create a virtual world where a control system for an autonomous vehicle can be trained and improved. The virtual world is configured to be identical (as possible) to the real world where vehicles are operated by human drivers. In other words, the simulated driver behavior data is indirectly useful for configuring the control system for the autonomous vehicle. It will be apparent to those of ordinary skill in the art that the human driver model system 201 and the traffic or vehicle image data 210 described and claimed herein can be implemented, configured, processed, and used in a variety of other applications and systems as well.

A basic human driver model may be used to simulate or predict the behavior of an autonomous vehicle with a simulated driver in a simulation scenario. The basic human driver model represents a virtual world configured to be identical (as possible) to the real world where vehicles are operated by human drivers. The virtual world can be used to train and improve a control system for an autonomous vehicle. Thus, the simulation can be indirectly useful for configuring the control systems in autonomous vehicles. Such human driver models can be parameterized models, which may be configured using either real-world input or randomized variables. In one example, the basic human driver model may simulate the typical and atypical driver behaviors, such as steering or heading control, speed or throttle control, and stopping or brake control. In one example, the basic human driver model may use, for example, sensory-motor transport delay, dynamic capabilities, and preferred driving behaviors. In some implementations, the human driver model may include modeling of the transport time delay between a stimulus and the simulated driver's control response. In some implementations, this delay may represent the time necessary for the driver to sense a stimulus, process it, determine the best corrective action, and respond. The human driver model may also include a speed control model with an absolute maximum vehicle speed (e.g., the maximum speed of the vehicle, the speed a driver is not comfortable exceeding, etc.) and a cornering aggressiveness measure to reduce the speed based on the turning radius. In the example, this may replicate the tendency of drivers to slow down through a turn. In the example, once the turning radius drops below the cornering threshold in the scenario, the speed may be reduced in proportion to the tightness of the turn.

In various example embodiments, the human driver model can be configured to simulate more than the typical driving behaviors. To simulate an environment that is identical to the real world as much as possible, the human driver model needs data concerning typical driving behaviors, which represent average people, while atypical driving behaviors are equally needed. In other words, in reality, most human drivers drive vehicles in a pleasant and humble way, while other drivers drive aggressively and impatiently. Equivalently, the simulation system of the various example embodiments includes data related to the driving behaviors of impolite and impatient drivers in the virtual world. In all, the human driver model can be configured with data representing driving behaviors as varied as possible.

In some implementations, the dynamics of how a human may respond to stimuli may be included in the human driver model, which may include, for example, a metric of how aggressively the driver brakes and accelerates. In some implementations, an aggressive driver may be modeled as one who applies very high control inputs to achieve the desired vehicle speeds, while a conservative driver may use more gradual control inputs. In some implementations, this may be modelled using parameterized values, with the input being controlled to the desired value. In some implementations, by adjusting the parameterized values, the aggressiveness of the simulated driver may be increased or decreased.

Figure 8:
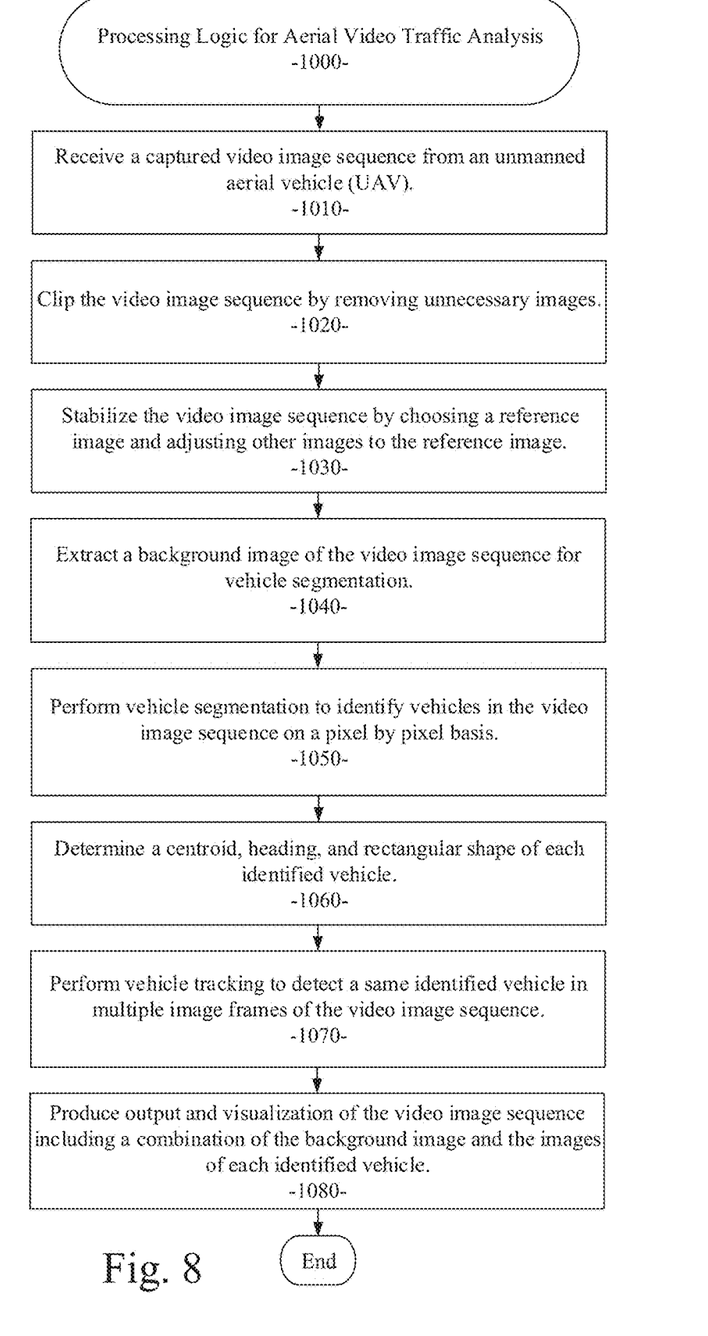
FIG. 8 is a process flow diagram illustrating an example embodiment of a system and method for traffic data collection using UAVs.

Referring now to FIG. 8, a flow diagram illustrates an example embodiment of a system and method 1000 for aerial video traffic analysis. The example embodiment can be configured to: receive a captured video image sequence from an unmanned aerial vehicle (UAV) (processing block 1010); clip the video image sequence by removing unnecessary images (processing block 1020); stabilize the video image sequence by choosing a reference image and adjusting other images to the reference image (processing block 1030); extract a background image of the video image sequence for vehicle segmentation (processing block 1040); perform vehicle segmentation to identify vehicles in the video image sequence on a pixel by pixel basis (processing block 1050); determine a centroid, heading, and rectangular shape of each identified vehicle (processing block 1060); perform vehicle tracking to detect a same identified vehicle in multiple image frames of the video image sequence (processing block 1070); and produce output and visualization of the video image sequence including a combination of the background image and the images of each identified vehicle (processing block 1080).

Figure 9:
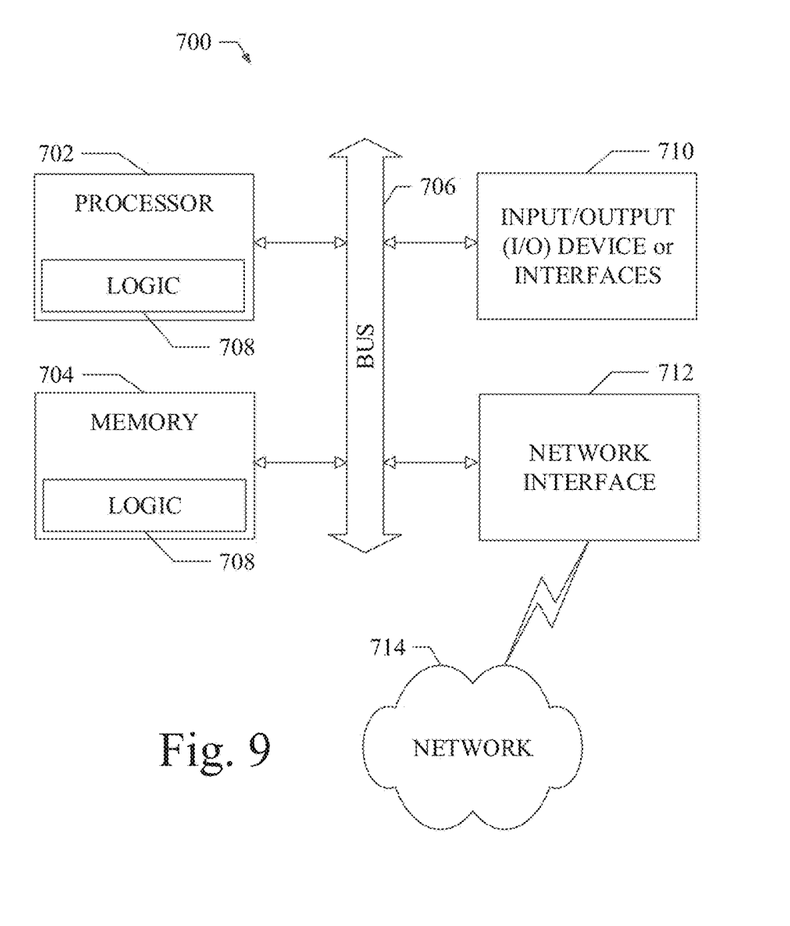
FIG. 9 shows a diagrammatic representation of machine in the example form of a computer system within which a set of instructions when executed may cause the machine to perform any one or more of the methodologies discussed herein.

FIG. 9 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   an unmanned aerial vehicle (UAV), equipped with a camera, deployed at an elevated position at a monitored location, the UAV configured to capture a video image sequence of the monitored location for a pre-determined period of time using the UAV camera;
   a data processor; and
   an image processing module, executable by the data processor, the image processing module being configured to:
      receive the captured video image sequence from the UAV;
      clip the video image sequence by removing unnecessary images from the video image sequence;
      stabilize the video image sequence by choosing a reference image and adjusting other images to the reference image;
      extract a background image of the video image sequence for vehicle segmentation;
      perform vehicle segmentation to identify vehicles in the video image sequence on a pixel by pixel basis using a trained neural network to classify individual pixels and produce a collection of pixel classifications corresponding to the video image sequence;
      generate a vehicle segmentation mask to determine a general shape of each vehicle identified in the video image sequence, the vehicle segmentation mask being generated using the collection of pixel classifications produced by the trained neural network;
      determine a centroid, heading, and rectangular shape of each identified vehicle based on the vehicle segmentation mask and the general shape of each vehicle;
      perform vehicle tracking to detect a same identified vehicle in multiple image frames of the video image sequence; and
      produce output and visualization of the video image sequence including a combination of the background image and the images of each identified vehicle.

2. The system of claim 1 wherein the image processing module being configured to extract a background image of the video image sequence by inferring a dominant color value from a collection of frames sampled over time from the video image sequence.

3. The system of claim 1 wherein the image processing module being configured to perform vehicle segmentation by concatenating a video image frame with the corresponding background image.

4. The system of claim 1 wherein the image processing module includes machine learnable components.

5. The system of claim 1 wherein the image processing module being configured to generate a direction along which a variance of the shape of a vehicle as a distribution is maximized.

6. The system of claim 1 wherein the image processing module being configured to determine if a vehicle detection overlaps in two sequential image frames.

7. The system of claim 1 wherein the output and visualization includes visual bounding boxes and velocity vectors for each identified vehicle.

8. The system of claim 1 further including a human driver model configured to predict or simulate human driver behaviors.

9. A method comprising:
   receiving a captured video image sequence from an unmanned aerial vehicle (UAV);
   clipping the video image sequence by removing unnecessary images from the video image sequence;
   stabilizing the video image sequence by choosing a reference image and adjusting other images to the reference image;
   extracting a background image of the video image sequence for vehicle segmentation;
   performing vehicle segmentation to identify vehicles in the video image sequence on a pixel by pixel basis using a trained neural network to classify individual pixels and produce a collection of pixel classifications corresponding to the video image sequence;
   generating a vehicle segmentation mask to determine a general shape of each vehicle identified in the video image sequence, the vehicle segmentation mask being generated using the collection of pixel classifications produced by the trained neural network;
   determining a centroid, heading, and rectangular shape of each identified vehicle based on the vehicle segmentation mask and the general shape of each vehicle;
   performing vehicle tracking to detect a same identified vehicle in multiple image frames of the video image sequence; and
   producing output and visualization of the video image sequence including a combination of the background image and the images of each identified vehicle.

10. The method of claim 9 including extracting the background image of the video image sequence by inferring a dominant color value from a collection of frames sampled over time from the video image sequence.

11. The method of claim 9 including performing vehicle segmentation by concatenating a video image frame with the corresponding background image.

12. The method of claim 9 including using machine learnable components.

13. The method of claim 9 including generating a direction along which a variance of the shape of a vehicle as a distribution is maximized.

14. The method of claim 9 including determining if a vehicle detection overlaps in two sequential image frames.

15. The method of claim 9 wherein the output and visualization includes visual bounding boxes and velocity vectors for each identified vehicle.

16. The method of claim 9 further including providing a human driver model configured to predict or simulate human driver behaviors.

* * * * *